(12) United States Patent
Barretto et al.

(10) Patent No.: US 10,130,036 B2
(45) Date of Patent: Nov. 20, 2018

(54) SELF ADJUSTABLE ROTOR FOR SUGAR CANE HARVESTER

(71) Applicant: CNH Industrial America LLC, New Holland, PA (US)

(72) Inventors: Mauro Barretto, Cotia-Sao Paulo (BR); Algirdas Butkevicius, Jr., Sorocaba-Sao Paulo (BR); Andre Peres, Sorocaba-SP (BR); Jose Veiga Leal, Curitiba-PR (BR); Jair Kamphorst, Sorocaba-SP (BR)

(73) Assignee: CNH Industrial America LLC, New Holland, PA (US)

( * ) Notice: Subject to any disclaimer, the term of this patent is extended or adjusted under 35 U.S.C. 154(b) by 286 days.

(21) Appl. No.: 14/889,074

(22) PCT Filed: May 7, 2014

(86) PCT No.: PCT/US2014/037120
§ 371 (c)(1),
(2) Date: Nov. 4, 2015

(87) PCT Pub. No.: WO2014/182796
PCT Pub. Date: Nov. 13, 2014

(65) Prior Publication Data
US 2016/0081275 A1    Mar. 24, 2016

Related U.S. Application Data

(60) Provisional application No. 61/820,538, filed on May 7, 2013.

(51) Int. Cl.
*A01D 45/10* (2006.01)
*A01D 61/00* (2006.01)
(Continued)

(52) U.S. Cl.
CPC ........... *A01D 61/008* (2013.01); *A01D 41/02* (2013.01); *A01D 45/10* (2013.01); *A01D 61/006* (2013.01); *A01D 69/03* (2013.01)

(58) Field of Classification Search
CPC ...... A01D 61/008; A01D 41/02; A01D 45/10; A01D 69/03; A01D 61/00; A01D 61/006; A01D 45/02
See application file for complete search history.

(56) References Cited

U.S. PATENT DOCUMENTS 2,703,956 A     3/1955  Pool
3,325,982 A  *  6/1967  Fogels ................... A01D 45/10
                                                              56/11.2
(Continued)

FOREIGN PATENT DOCUMENTS

GB         1424511 A      2/1976

*Primary Examiner* — John Weiss
(74) *Attorney, Agent, or Firm* — Patrick M Sheldrake

(57) ABSTRACT

A sugar cane harvester including a chassis for power directional movement across a field with a row dividing assembly feeding a base cutter that severs sugar cane stalks for delivery to a feed system. A rotor assembly is provided between the base cutter and the feed assembly with the rotor assembly being powered for rotation about an axis at right angles to the flow of sugar cane stalks through the harvester. The rotor assembly includes a pair of cylinders powered by a hydraulic motor with the cylinders having axially extending ribs and radially extending fingers for moving sugar cane in a downstream direction. The rotor assembly is connected to the harvester chassis by a linkage and supported by an actuator which is controlled by a hydraulic system to maintain a uniform and preselected downward pressure on sugar cane stalks as they move in a downstream direction through the harvester.

19 Claims, 4 Drawing Sheets

(51) Int. Cl.
*A01D 41/02* (2006.01)
*A01D 69/03* (2006.01)

(56) References Cited

U.S. PATENT DOCUMENTS

| | | | | |
|---|---|---|---|---|
| 3,492,798 A * | 2/1970 | Hart | ............ | A01D 45/10 56/10.7 |
| 3,599,404 A * | 8/1971 | Fernandez | ............ | A01D 45/10 56/12.8 |
| 3,665,686 A * | 5/1972 | Duncan | ............ | A01D 45/10 56/11.3 |
| 3,828,536 A * | 8/1974 | Fowler | ............ | A01D 45/10 209/153 |
| 3,848,399 A * | 11/1974 | Makeham | ............ | A01D 45/10 56/13.9 |
| 3,950,924 A | 4/1976 | Quick | | |
| 4,019,308 A * | 4/1977 | Quick | ............ | A01D 45/10 56/13.9 |
| 4,098,060 A | 7/1978 | Quick | | |
| 4,152,883 A | 5/1979 | Quick | | |
| 4,154,047 A * | 5/1979 | Quick | ............ | A01D 45/10 56/13.9 |
| 4,194,344 A * | 3/1980 | Mizzi | ............ | A01D 45/10 198/518 |
| 6,076,340 A * | 6/2000 | Fowler | ............ | A01D 45/10 56/13.3 |
| 6,508,049 B1 * | 1/2003 | Cox | ............ | A01D 45/10 56/10.2 R |
| 7,454,888 B2 | 11/2008 | Barnett | | |
| 8,056,309 B2 | 11/2011 | Vandendriessche | | |
| 2005/0034439 A1 * | 2/2005 | Galea | ............ | A01D 45/10 56/51 |
| 2007/0119140 A1 * | 5/2007 | Gette | ............ | A01D 89/008 56/364 |
| 2014/0295922 A1 * | 10/2014 | Buermann | ............ | A01D 41/141 460/1 |
| 2015/0359177 A1 * | 12/2015 | Richard | ............ | A01D 45/10 56/14.7 |
| 2015/0362904 A1 * | 12/2015 | Scrivner | ............ | A01D 41/127 700/275 |

* cited by examiner

SELF ADJUSTABLE ROTOR FOR SUGAR CANE HARVESTER

This application is the US National Stage filing of International Application Serial No. PCT/US2014/037120, filed on May 7, 2014 which claims priority to U.S. Provisional Applications with Ser. Nos. 61/820,538, filed May 7, 2013, each of which is hereby incorporated by reference in its entirety.

BACKGROUND OF THE INVENTION

1. Field of the Invention

The present invention relates to sugar cane harvesters, and, more particularly, to rotors used in such sugar cane harvesters

2. Description of the Related Art

In the harvesting of sugar cane there are instances in the field where the sugar cane grows in a position that is not fully upright. In some cases, the sugar cane can grow lying on the ground. As a result, when the sugar cane reaches a mature size just prior to the time the sugar cane is to be harvested, the individual canes are not aligned relative to each other. In many cases they may be interwoven.

In some sugar cane harvesters, the base cutter for the sugar cane stalks is placed in the most forward or upstream end adjacent the crop row dividers. As a result, the two are a substantial distance from the feeding system for the sugar cane stalks. As the harvester moves forward, the already cut stalks lying on the ground and interwoven with one another reach the harvester at a point where the crop processing path substantially narrows. This causes an accumulation of material that interrupts the crop conveying to the feeding system. As a result, each new cut cane is laid over the accumulated material at the point at which the crop path narrows. This can have an adverse effect on the expected performance of the sugar cane harvester.

What is needed in the art therefore, is a cane processing system that minimizes the effect of interwoven sugar cane stalks in the field.

SUMMARY OF THE INVENTION

The invention seeks to minimize if not eliminate the aforementioned problems.

In one form, the invention is a rotor assembly for use in a sugar cane harvester. The assembly includes a cylinder mounted for rotation about an axis that is perpendicular to the flow of sugar cane material through the harvester after it has been initially cut. A device is provided for powering the cylinder into rotation to urge crop material in a downstream direction. The cylinder is mounted for movement generally in an up and down direction relative to the ground for contacting sugar cane that has been cut. An actuator controls the height of the rotor relative to the ground. The rotor has a plurality of axially extending ribs to improve traction on the sugar cane and a plurality of fingers extends radially outward from the cylinder to embed in between the cane stalks to properly align them. A hydraulic system maintains a constant downward pressure on the cylinder so that the cane stalks are uniformly pushed in a downstream direction irrespective of the thickness of the accumulation of the sugar cane stalks.

The invention, in another form, is a sugar cane harvester having a chassis propelled for movement across a field in a forward direction. The chassis has sugar cane row dividers, a downstream base cutter. A sugar cane processing apparatus is positioned downstream of the base cutter and a rotor assembly is positioned in between the base cutter and the processing apparatus. The rotor includes a cylinder rotatable about an axis perpendicular to the flow path of sugar cane stalks through the harvester. A device is provided for powering the cylinder into rotation in a way that moves the sugar cane in a downstream direction. A plurality of axially extending ribs are provided on the cylinder for moving the cut sugar cane in a downstream direction and a plurality of fingers extend radially from the cylinder to embed between the sugar cane stalks. The cylinder is mounted for generally up and down movement relative to the ground and an actuator controlled by a hydraulic system translates the cylinder up and down relative to the crops to maintain a constant pressure irrespective of the thickness of the crop.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplifications is not to be construed as limiting the scope of the invention in any manner.

DETAILED DESCRIPTION OF THE INVENTION

Figure 1:
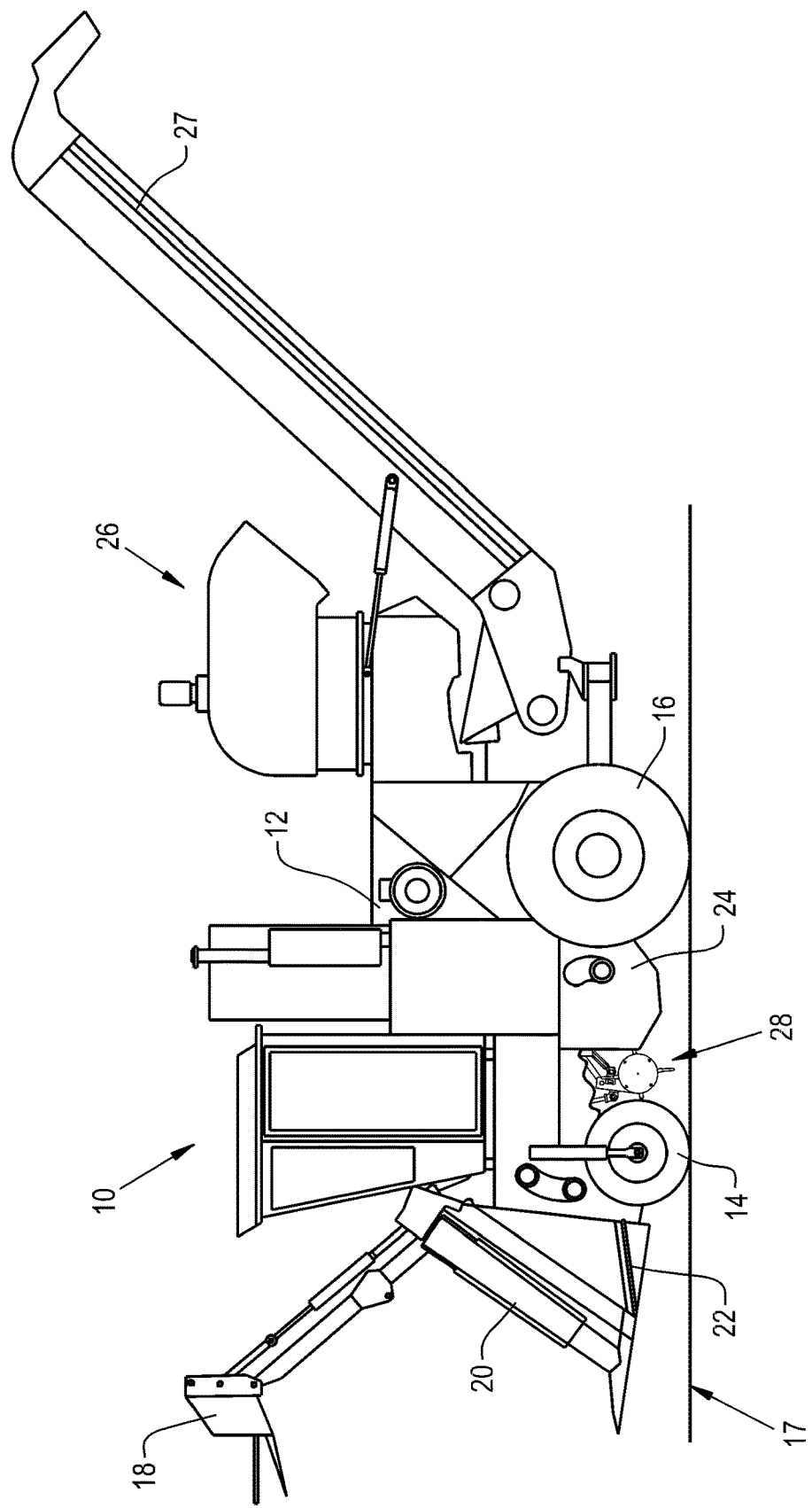
FIG. 1 is a side view of a sugar cane harvester with which the present invention may be utilized.
Figure 2:
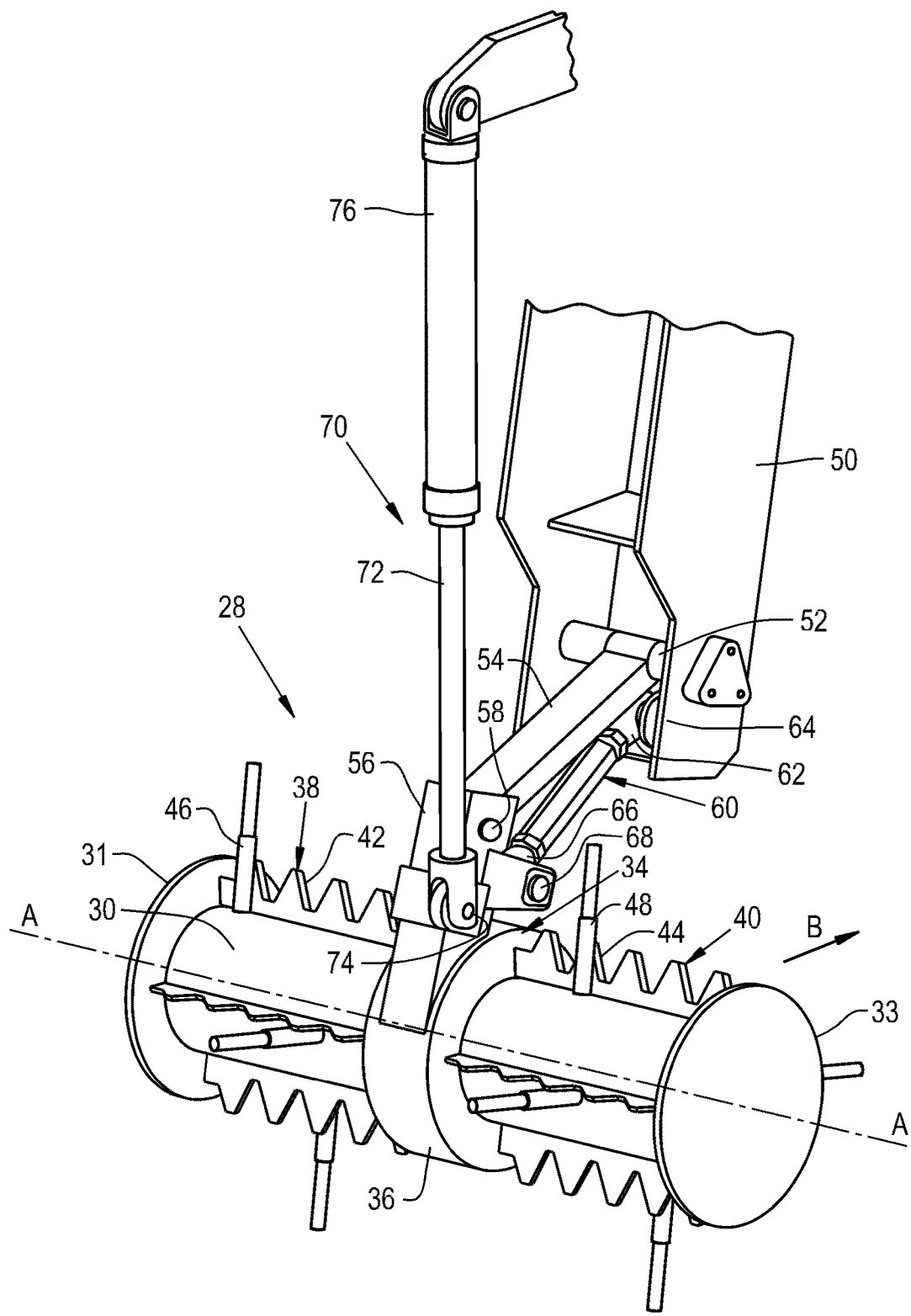
FIG. 2 is a perspective view of a rotor incorporated in the sugar cane harvester of FIG. 1.
Figure 3:
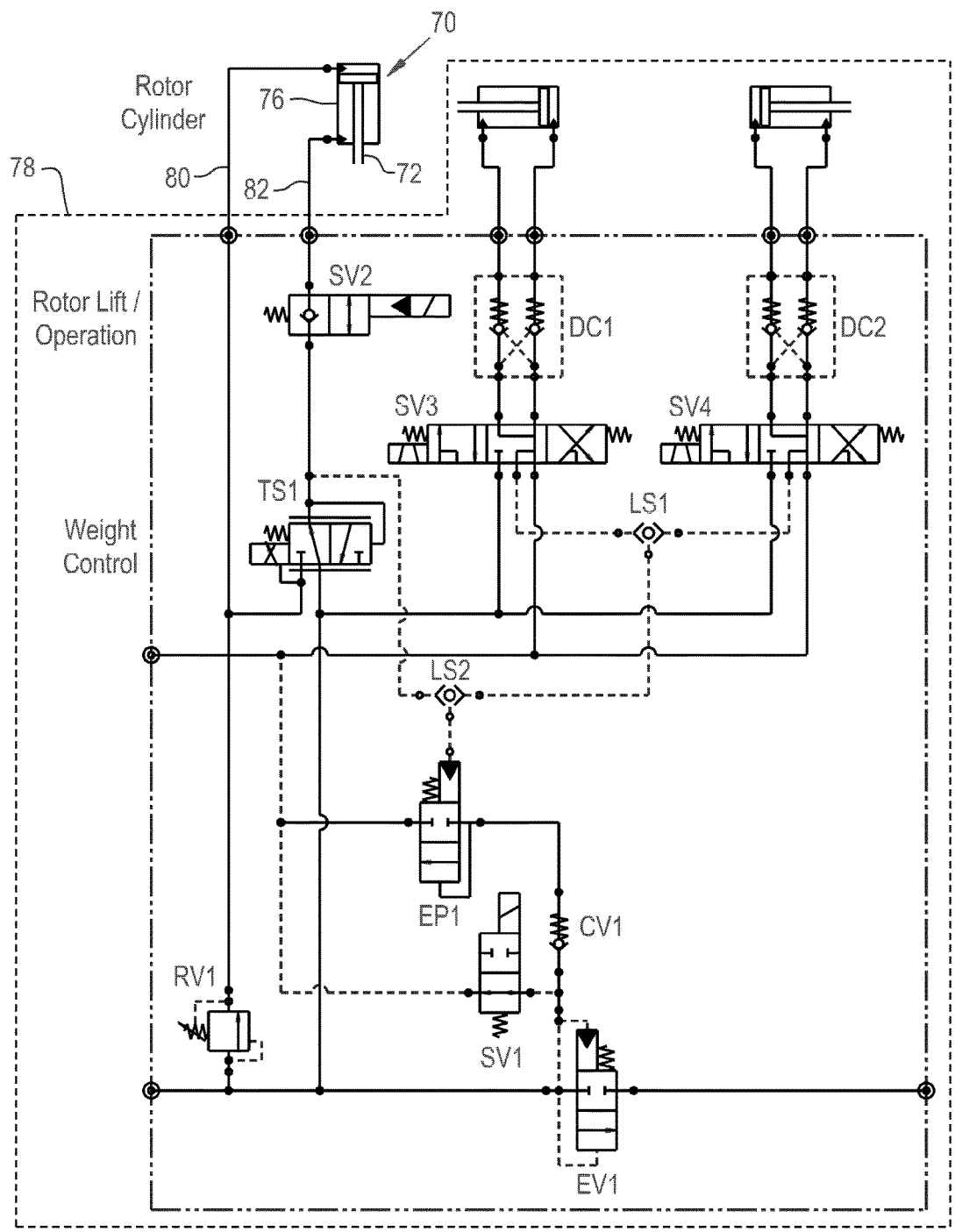
FIG. 3 is a hydraulic system used to actuate the rotor of FIG. 2.

FIG. 1 shows a sugar cane harvester 10 including a chassis 12 having front 14 and rear 16 wheels for powered directional movement across a field 17. The chassis 12 is powered by an appropriate form of engine, usually an internal combustion engine. The wheels 14 and 16 provide movement across a field as well as steering. It should be apparent to those skilled in the art that a wide variety of propulsion units as well as ground movement arrangements may be employed for the chassis 10 so that it moves across a field to harvest sugar cane.

A topper assembly 18 extends forward from the chassis 10 to sever the tops of sugar cane stalks to facilitate harvesting. A crop row divider assembly 20 includes a pair of rollers that divide the crops and move the sugar cane stalk in a downstream direction relative to the forward movement of chassis 10 where the base of the stalks is cut by an adjacent base cutter assembly 22. The base cutter assembly 22 usually consists of overlapping rotating disks into which the stalks are fed to sever them at their base. The cut stalks, along with unwanted material, are moved in a downstream direction to feed mechanism 24 that delivers the material in billets to equipment, generally indicated by 26, that cleans unwanted material and other crop pieces from the billets and extracts further trash to ultimately place them in a form to be delivered to a crop wagon by a conveyor 27.

In accordance with the present invention, the rotor assembly 28 shown in FIGS. 2-5 is positioned between the base cutter 22 and the feed mechanism 24 to facilitate organized movement of the cut sugar cane stalks. The rotor assembly 28 can encompass two rows of sugar cane stalks, but it may also be employed for a single row. As shown particularly in FIG. 2, rotor assembly 28 includes a pair of cylinders 30 and 32 journaled for rotation about an axis A that is generally perpendicular with respect to the flow of sugar cane stalks through a harvester 10. Cylinders 30 and 32 are supported for rotation by a central hydraulic motor 34 about driving shafts (not shown) to facilitate an understanding of the invention.

Motor assembly 34 has an external housing 36 for an appropriate hydraulic motor having a rotatable output to which the cylinders 30 and 32 are attached. Although the motor assembly 34 shown has a hydraulic motor it should be apparent to those skilled in the art that the motor 34 may come in forms other than the hydraulic and still provide the function of driving the cylinders 30 and 32 in rotation.

The cylinders 30 and 32 have end flanges 31 and 33. Cylinders 30 and 32 also have a plurality of axially extending ribs 38 and 40 positioned at spaced locations around the circumference of the cylinders 30 and 32 respectively. The ribs 38 and 40 have serrations 42 and 44 to provide additional traction to move cut sugar cane stalks in a downstream direction indicated by arrow B. Additionally, a plurality of radially extending fingers 46 and 48 are provided on the cylinders 30 and 32. Fingers 46 and 48 extend radially outward sufficiently to embed into and between cut sugar cane stalks to properly separate them as they move in the direction B. The length of fingers 46 and 48 is appropriate for the particular conditions involved.

The motor housing 36 and thus the cylinders 30 and 32 are mounted for displacement relative to the chassis 12. This is provided through a bracket 50 fixed and mounted to the chassis 12. Bracket 50 has a pin 52 to which a first arm 54 is pivotally attached. Arm 54 extends to a bracket 56 fixed to motor housing 36 where it is pivotally mounted thereto at a pin 58. A second telescoping arm 60 has one end 62 pivotally attached to bracket 50 at 64 and a second end 66 pivotally attached to bracket 56 through a pin 68. As described below, arm 60 can be lengthened or shortened between 64 and pin 68.

An actuator 70 has an output shaft 72 pivotally connected to bracket 56 at joint 74. A cylinder 76 for actuator 70 is pivotally connected to chassis 12 at a location not shown. The actuator 70 receives control inputs from a hydraulic control system 78, schematically shown in FIG. 3 through lines 80 and 82. Although the details of the hydraulic control system 78 are not described, the interconnection with the actuator 70 is illustrated. The hydraulic system 78 utilizes a source of hydraulic pressure provided through chassis 12 to maintain a constant predetermined downward pressure on cylinders 30 and 32 irrespective of the location of cylinders 30 and 32 relative to the ground 17.

Figure 4:
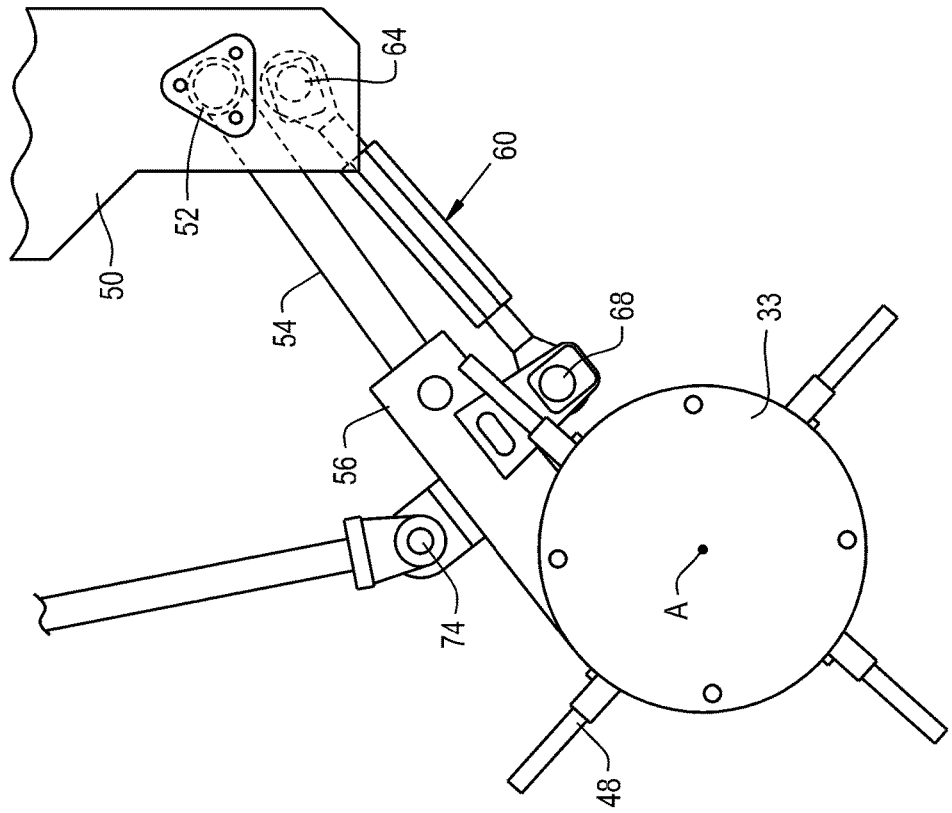
FIGS. 4 and 5 show the rotor of FIG. 2 in different positions.
Figure 5:
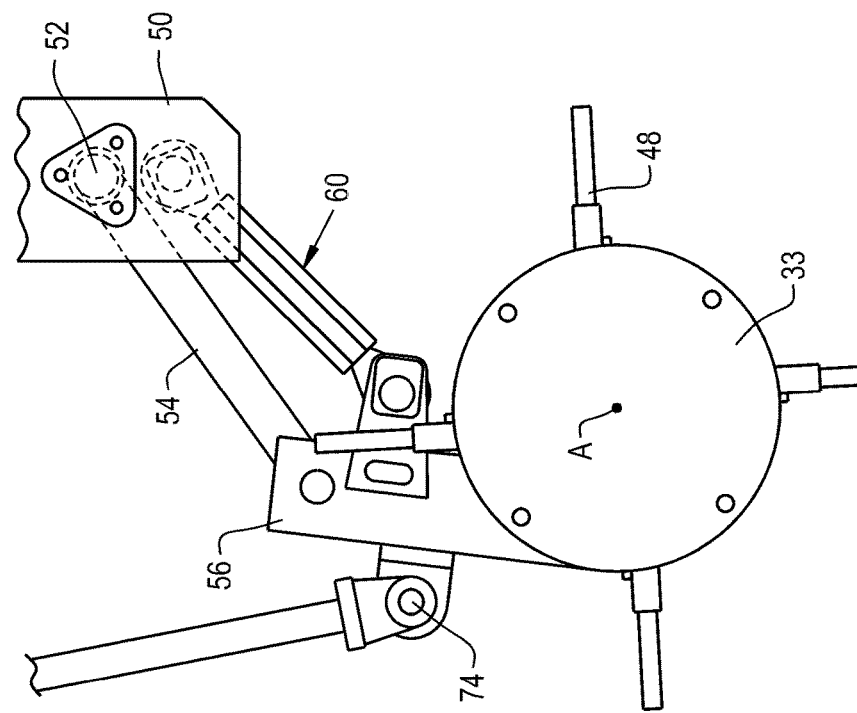

FIGS. 4 and 5 illustrate the range of displacement for cylinders 30 and 32. In FIG. 4, the rotor assembly is in an upmost position and in FIG. 5 it is in a lowered position. The links 54 and 60 are arranged in a pentagraph arrangement to permit movement of the cylinders 30 and 32 relative to bracket 50. As shown particularly in between FIGS. 4 and 5, the bracket 56 pivots as it is displaced. It should also be noted that the link 60 has a variable length, with the length in FIG. 4 in the upmost position being smaller than the length in FIG. 5 in the downward most position.

In operation, the flow of cut cane stalks in a downstream direction B towards the feed apparatus 24 produces variable height. Because the hydraulic system 78 provides a preselected downward pressure on cylinders 30 and 32, a uniform traction is applied to the sugar cane stalks. If a group of stalks having a greater thickness enters the region of the cylinders 30 and 32, the actuator 70 backs off its displacement to maintain the preselected pressure. When the thickened group of stalks passes, the hydraulic system 78 lowers the actuator 70 to apply the uniform pressure.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A rotor assembly for a sugar cane harvester having a flow of sugar cane stalks in a random array along the ground over which the sugar cane harvester traverses, said rotor assembly comprising:
    a cylinder assembly mounted for rotation about an axis that is perpendicular to the flow of material through said harvester;
    a motor mounting the cylinder for powered rotation about its axis to move sugar cane stalks in a downstream direction;
    a plurality of axially extending ribs for providing additional traction on the cut sugar cane stalks;
    a plurality of radially extending fingers projecting from said cylinder to be embedded in between cut sugar cane stalks;
    an assembly mounting said motor and said cylinder for displacement toward and away from the ground;
    an actuator connected to said assembly for displacement between a position close to the ground and a position further away from the ground; and
    a system actuating said actuator for maintaining a predetermined uniform downward pressure so as to maintain a consistent pressure on cut sugar cane stalks irrespective of the thickness of the group of stalks relative to the ground.

2. The rotor assembly of claim 1, wherein the assembly mounting the motor and cylinder is a linkage.

3. The rotor assembly of claim 2, wherein the linkage extends in a forward direction.

4. The rotor assembly of claim 3, wherein the linkage includes first and second links, one of which is fixed in length and the other is variable.

5. The rotor assembly of claim 1, wherein the axially extending ribs have serrations to improve traction.

6. The rotor assembly of claim 1, wherein the motor is a hydraulic motor.

7. The rotor assembly of claim 1, wherein the actuator is hydraulic.

8. The rotor assembly of claim 7, further comprising a hydraulic control system for applying a preselected hydraulic pressure to the actuator for applying downward pressure.

9. The rotor assembly of claim 1, in which the motor is centrally located and mounts a pair of cylinder assemblies extending on either side.

10. A sugar cane harvester comprising:
a chassis;
a device for providing powered directional ground movement of said chassis;
an upstream row crop divider for dividing sugar cane rows and feeding them in a downstream direction;
a base cutter assembly receiving sugar cane stalks from said crop divider for severing the stalks at their base;
a feeder assembly downstream of the base cutter;
a rotor assembly positioned between said base cutter and said feed assembly, said rotor assembly comprising:
a cylinder assembly mounted for rotation about an axis that is perpendicular to the flow of material through said harvester;
a motor mounting the cylinder for powered rotation about the axis in to move sugar cane stalks in a downstream direction;
a plurality of axially extending ribs for providing additional traction on the cut sugar cane stalks;
a plurality of radially extending fingers projecting from said cylinder to be embedded in between cut sugar cane stalks;
an assembly mounting said motor and said cylinder for displacement toward and away from the ground;
an actuator connected to said assembly for displacement between a position closes to the ground and a position away from the ground; and
a system actuating said actuator for maintaining a predetermined uniform downward pressure so as to maintain a consistent pressure on cut sugar cane stalks irrespective of the thickness of the group of stalks relative to the ground.

11. The sugar cane harvester of claim 10, in which the assembly mounting said motor and cylinder is a linkage connected to said chassis.

12. The sugar cane harvester of claim 11, wherein the linkage extends in a forward direction.

13. The sugar cane harvester of claim 12, wherein the linkage includes first and second linkage links, one of which is fixed in length and the other is variable.

14. The sugar cane harvester of claim 10, wherein the ribs are serrated for improved traction.

15. The sugar cane harvester of claim 10, wherein the motor is a hydraulic motor.

16. The sugar cane harvester of claim 10, wherein the actuator is hydraulic.

17. The sugar cane harvester of claim 16, further comprising a hydraulic control system for applying a variable pressure to said actuator to apply uniform pressure on the sugar cane stalks.

18. The sugar cane harvester of claim 10, wherein the motor includes a pair of cylinders extending on either side and being co-driven by said motor.

19. The sugar cane harvester of claim 18, for harvesting two rows of sugar cane stalks by utilizing the pair of cylinders mounted on said motor.

* * * * *